United States Patent
Nelson et al.

(10) Patent No.: US 11,072,732 B2
(45) Date of Patent: Jul. 27, 2021

(54) MAGNETIZABLE ABRASIVE PARTICLES AND ABRASIVE ARTICLES INCLUDING THEM

(71) Applicant: 3M INNOVATIVE PROPERTIES COMPANY, St. Paul, MN (US)

(72) Inventors: Thomas J. Nelson, St. Paul, MN (US); Joseph B. Eckel, Vadnais Heights, MN (US); Aaron K. Nienaber, Maplewood, MN (US); Jaime A. Martinez, Woodbury, MN (US); Eli A. Davis, Royal Oak, MI (US); Louis S. Moren, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 116 days.

(21) Appl. No.: 16/344,256

(22) PCT Filed: Sep. 27, 2017

(86) PCT No.: PCT/US2017/053684
§ 371 (c)(1),
(2) Date: Apr. 23, 2019

(87) PCT Pub. No.: WO2018/080703
PCT Pub. Date: May 3, 2018

(65) Prior Publication Data
US 2019/0249053 A1    Aug. 15, 2019

Related U.S. Application Data

(60) Provisional application No. 62/412,402, filed on Oct. 25, 2016.

(51) Int. Cl.
*C09K 3/14* (2006.01)
*C04B 35/628* (2006.01)
(Continued)

(52) U.S. Cl.
CPC ............ *C09K 3/1436* (2013.01); *B24D 11/00* (2013.01); *C04B 35/1115* (2013.01);
(Continued)

(58) Field of Classification Search
CPC ................ C09K 3/1436; C04B 35/111; C04B 35/62815; C04B 35/62886; C08K 3/22; C08K 9/02; C08K 9/04; C08K 2201/01
See application file for complete search history.

(56) References Cited

U.S. PATENT DOCUMENTS

| 1,930,788 A | 10/1933 | Buckner |
| 2,216,728 A | 10/1940 | Benner |

(Continued)

FOREIGN PATENT DOCUMENTS

| CN | 1830626 | 9/2006 |
| CN | 101353566 | 1/2009 |

(Continued)

OTHER PUBLICATIONS

Barbee, Jr., "Microstructure of amorphous 304 stainless steel-carbon alloys synthesized by magnetron sputter deposition", Thin Solid Films, 1979, vol. 63, No. 1, pp. 143-150.

(Continued)

*Primary Examiner* — Pegah Parvini
(74) *Attorney, Agent, or Firm* — Bradford B. Wright

(57) ABSTRACT

A magnetizable abrasive particle comprises a ceramic body having an outer surface and a magnetizable layer disposed on a portion, but not the entirety, of the outer surface. The ceramic body comprises a platelet having two opposed major facets connected to each other by a plurality of side facets. The magnetizable layer completely covers one of the two opposed major facets, and the magnetizable layer has a magnetic dipole oriented perpendicular or parallel to the facet which it completely covers. A plurality of the magne- (Continued)

tizable abrasive particles, and abrasive articles including them are also disclosed. Methods of making the foregoing are also disclosed.

13 Claims, 9 Drawing Sheets

(51) Int. Cl.
| | |
|---|---|
| *C04B 35/624* | (2006.01) |
| *B24D 11/00* | (2006.01) |
| *C08K 3/22* | (2006.01) |
| *C04B 35/111* | (2006.01) |
| *C08G 8/10* | (2006.01) |
| *C08K 7/00* | (2006.01) |
| *C08K 9/02* | (2006.01) |
| *C08K 9/04* | (2006.01) |
| *H01F 1/03* | (2006.01) |

(52) U.S. Cl.
CPC ...... *C04B 35/624* (2013.01); *C04B 35/62815* (2013.01); *C04B 35/62826* (2013.01); *C04B 35/62886* (2013.01); *C08G 8/10* (2013.01); *C08K 3/22* (2013.01); *C08K 7/00* (2013.01); *C08K 9/02* (2013.01); *C08K 9/04* (2013.01); C04B 2235/3217 (2013.01); C04B 2235/3272 (2013.01); C04B 2235/52 (2013.01); C04B 2235/5292 (2013.01); C04B 2235/94 (2013.01); C04B 2235/96 (2013.01); C08K 2003/2227 (2013.01); C08K 2201/01 (2013.01); *H01F 1/0302* (2013.01)

(56) References Cited

U.S. PATENT DOCUMENTS

| | | | |
|---|---|---|---|
| 2,318,570 A | 5/1943 | Carlton | |
| 2,370,636 A | 3/1945 | Carlton | |
| 2,527,044 A | 10/1950 | Walton | |
| 2,857,879 A | 10/1958 | Johnson | |
| 2,947,616 A | 8/1960 | Coes, Jr. | |
| 2,958,593 A | 11/1960 | Hoover | |
| 3,306,719 A | 2/1967 | Fringhian | |
| 3,495,960 A | 2/1970 | Schladitz | |
| 3,625,666 A | 12/1971 | James | |
| 3,918,217 A | 11/1975 | Oliver | |
| 4,008,055 A | 2/1977 | Phaal | |
| 4,018,575 A | 4/1977 | Davis | |
| 4,227,350 A | 10/1980 | Fitzer | |
| 4,246,004 A | 1/1981 | Busch | |
| 4,314,827 A | 2/1982 | Leitheiser | |
| 4,331,453 A | 5/1982 | Dau | |
| 4,609,380 A | 9/1986 | Barnett | |
| 4,612,242 A | 9/1986 | Vesley | |
| 4,623,364 A | 11/1986 | Cottringer | |
| 4,652,274 A | 3/1987 | Boettcher | |
| 4,652,275 A | 3/1987 | Bloecher | |
| 4,734,104 A | 3/1988 | Broberg | |
| 4,744,802 A | 5/1988 | Schwabel | |
| 4,751,137 A | 6/1988 | Halg | |
| 4,751,138 A | 6/1988 | Tumey | |
| 4,770,671 A | 9/1988 | Monroe | |
| 4,799,939 A | 1/1989 | Bloecher | |
| 4,800,685 A | 1/1989 | Haynes, Jr. | |
| 4,881,951 A | 11/1989 | Wood | |
| 4,898,597 A | 2/1990 | Hay | |
| 4,903,440 A | 2/1990 | Larson | |
| 4,916,869 A | 4/1990 | Oliver | |
| 4,933,373 A | 6/1990 | Moren | |
| 4,985,340 A | 1/1991 | Palazzotto | |
| 4,991,362 A | 2/1991 | Heyer | |
| 5,009,675 A | 4/1991 | Kunz | |
| 5,086,086 A | 2/1992 | Brown-Wensley | |
| 5,137,542 A | 8/1992 | Buchanan | |
| 5,152,917 A | 10/1992 | Pieper | |
| 5,181,939 A | 1/1993 | Neff | |
| 5,201,916 A | 4/1993 | Berg | |
| 5,213,590 A * | 5/1993 | Neff | B24D 3/08 |
| | | | 209/8 |
| 5,213,591 A | 5/1993 | Celikkaya | |
| 5,236,472 A | 8/1993 | Kirk | |
| 5,254,194 A | 10/1993 | Ott | |
| 5,282,875 A | 2/1994 | Wood | |
| 5,366,523 A | 11/1994 | Rowenhorst | |
| 5,376,428 A | 12/1994 | Palazzotto | |
| 5,380,390 A | 1/1995 | Tselesin | |
| 5,385,954 A | 1/1995 | Palazzotto | |
| 5,417,726 A | 5/1995 | Stout | |
| 5,435,816 A | 7/1995 | Spurgeon | |
| 5,454,844 A | 10/1995 | Hibbard | |
| 5,500,273 A | 3/1996 | Holmes | |
| 5,554,068 A | 9/1996 | Carr | |
| 5,567,502 A * | 10/1996 | Miyabara | G11B 5/7085 |
| | | | 428/141 |
| 5,573,619 A | 11/1996 | Benedict | |
| 5,591,239 A | 1/1997 | Larson | |
| RE35,570 E | 7/1997 | Rowenhorst | |
| 5,672,097 A | 9/1997 | Hoopman | |
| 5,672,186 A | 9/1997 | Chesley | |
| 5,681,217 A | 10/1997 | Hoopman | |
| 5,681,361 A | 10/1997 | Sanders, Jr. | |
| 5,700,302 A | 12/1997 | Stoetzel | |
| 5,712,210 A | 1/1998 | Windisch | |
| 5,817,204 A | 10/1998 | Tselesin | |
| 5,833,724 A | 11/1998 | Wei | |
| 5,851,247 A | 11/1998 | Stoetzel | |
| 5,858,140 A | 1/1999 | Berger | |
| 5,863,306 A | 1/1999 | Wei | |
| 5,891,204 A | 4/1999 | Neff | |
| 5,908,476 A | 6/1999 | Nishio | |
| 5,928,070 A | 7/1999 | Lux | |
| 5,942,015 A | 8/1999 | Culler | |
| 5,946,991 A | 9/1999 | Hoopman | |
| 5,975,987 A | 11/1999 | Hoopman | |
| 5,984,988 A | 11/1999 | Berg | |
| 6,017,831 A | 1/2000 | Beardsley | |
| 6,048,375 A | 4/2000 | Yang | |
| 6,083,631 A | 7/2000 | Neff | |
| 6,120,568 A | 9/2000 | Neff | |
| 6,129,540 A | 10/2000 | Hoopman | |
| 6,139,594 A | 10/2000 | Kincaid | |
| 6,207,246 B1 | 3/2001 | Moren | |
| 6,261,682 B1 | 7/2001 | Law | |
| 6,293,980 B2 | 9/2001 | Wei | |
| 6,302,930 B1 | 10/2001 | Lux | |
| 6,319,108 B1 | 11/2001 | Adefris | |
| 6,354,929 B1 | 3/2002 | Adefris | |
| 6,521,004 B1 | 2/2003 | Culler | |
| 6,551,366 B1 | 4/2003 | D'Souza | |
| 6,620,214 B2 | 9/2003 | McArdle | |
| 6,645,624 B2 | 11/2003 | Adefris | |
| 6,702,650 B2 | 3/2004 | Adefris | |
| 6,790,126 B2 | 9/2004 | Wood | |
| 6,817,935 B2 | 11/2004 | Bates | |
| 6,881,483 B2 | 4/2005 | McArdle | |
| 6,913,824 B2 | 7/2005 | Culler | |
| 6,951,504 B2 | 10/2005 | Adefris | |
| 7,399,330 B2 | 7/2008 | Schwabel | |
| 7,410,413 B2 | 8/2008 | Woo | |
| 7,491,251 B2 | 2/2009 | Welygan | |
| 7,727,931 B2 | 6/2010 | Brey | |
| 7,887,608 B2 | 2/2011 | Schwabel | |
| 8,034,137 B2 | 10/2011 | Erickson | |
| 8,142,531 B2 | 3/2012 | Adefris | |
| 8,142,532 B2 | 3/2012 | Erickson | |
| 8,142,891 B2 | 3/2012 | Culler | |
| 8,262,758 B2 | 9/2012 | Gao | |
| 8,425,278 B2 | 4/2013 | Culler | |
| 8,698,394 B2 | 4/2014 | McCutcheon | |
| 8,814,967 B2 * | 8/2014 | Upadhyay | B24D 3/342 |
| | | | 51/307 |
| 8,869,740 B2 | 10/2014 | Moren | |

(56) References Cited

U.S. PATENT DOCUMENTS

| | | |
|---|---|---|
| 9,440,332 B2 | 9/2016 | Gaeta et al. |
| 2001/0041511 A1 | 11/2001 | Lack |
| 2002/0160694 A1 | 10/2002 | Wood |
| 2003/0022604 A1 | 1/2003 | Annen |
| 2003/0143938 A1 | 7/2003 | Braunschweig |
| 2004/0098923 A1* | 5/2004 | Hood ............ B24D 3/348 51/296 |
| 2005/0218566 A1 | 10/2005 | Suzuki |
| 2005/0279028 A1 | 11/2005 | Keipert |
| 2007/0254560 A1 | 11/2007 | Woo |
| 2008/0131705 A1 | 6/2008 | Colburn |
| 2008/0289262 A1 | 11/2008 | Gao |
| 2009/0165394 A1 | 7/2009 | Culler |
| 2009/0169816 A1 | 7/2009 | Erickson |
| 2010/0146867 A1 | 6/2010 | Boden |
| 2010/0151196 A1 | 6/2010 | Adefris |
| 2011/0088330 A1 | 4/2011 | Beekman |
| 2012/0137597 A1 | 6/2012 | Adefris |
| 2012/0227333 A1 | 9/2012 | Adefris |
| 2013/0040537 A1 | 2/2013 | Schwabel |
| 2013/0125477 A1 | 5/2013 | Adefris |
| 2013/0244552 A1 | 9/2013 | Lee |
| 2013/0252521 A1 | 9/2013 | Kasashima |
| 2013/0252522 A1 | 9/2013 | Kasashima |
| 2013/0344786 A1 | 12/2013 | Keipert |
| 2014/0000176 A1 | 1/2014 | Moren |
| 2014/0080393 A1 | 3/2014 | Ludwig |
| 2014/0106126 A1 | 4/2014 | Gaeta |
| 2014/0237907 A1 | 8/2014 | Boden |
| 2014/0259961 A1 | 9/2014 | Moren |
| 2014/0290147 A1 | 10/2014 | Seth |
| 2014/0291895 A1 | 10/2014 | Kanade |
| 2015/0090013 A1 | 4/2015 | Dasgupta et al. |
| 2015/0210910 A1* | 7/2015 | Hejtmann ........ C04B 35/1115 51/309 |
| 2015/0259587 A1 | 9/2015 | Oldenkotte et al. |
| 2015/0267097 A1 | 9/2015 | Rosenflanz |
| 2015/0291865 A1 | 10/2015 | Breder |
| 2016/0144480 A1 | 5/2016 | Eugster et al. |
| 2016/0221153 A1* | 8/2016 | Rizzo, Jr. ........... B24D 5/02 |

FOREIGN PATENT DOCUMENTS

| | | |
|---|---|---|
| CN | 101481597 A | 7/2009 |
| CN | 103590090 | 2/2014 |
| CN | 104191385 | 12/2014 |
| CN | 104254429 A | 12/2014 |
| CN | 104999385 | 10/2015 |
| DE | 3042643 | 7/1981 |
| DE | 102012221316 | 5/2014 |
| DE | 202014101741 | 6/2014 |
| DE | 102013212609 | 12/2014 |
| DE | 102013212617 | 12/2014 |
| DE | 102013212639 | 12/2014 |
| DE | 102013212666 | 12/2014 |
| DE | 102013212684 | 12/2014 |
| EP | 1122718 A2 | 8/2001 |
| EP | 2692818 | 2/2014 |
| GB | 396231 | 8/1933 |
| GB | 1477767 | 6/1977 |
| JP | 63232947 | 9/1988 |
| JP | 0778509 | 3/1995 |
| JP | 11165252 | 6/1999 |
| JP | 2002053367 | 2/2002 |
| JP | 2004098265 | 4/2004 |
| JP | 2004098266 | 4/2004 |
| JP | 2005153106 | 6/2005 |
| JP | 2006089586 | 4/2006 |
| JP | 2012131017 | 7/2012 |
| JP | 2012131018 | 7/2012 |
| JP | 2015155142 | 8/2015 |
| JP | 5982580 | 8/2016 |
| KR | 1020100136807 | 12/2010 |
| KR | 101473367 | 5/2014 |
| SU | 1495100 | 7/1989 |
| WO | WO 94-27833 | 12/1994 |
| WO | WO 2009-011973 | 1/2009 |
| WO | WO 2010-041645 | 4/2010 |
| WO | WO 2012-112305 | 8/2012 |
| WO | WO 2015-048768 | 4/2015 |
| WO | WO 2015-088953 | 6/2015 |
| WO | WO 2015-100018 | 7/2015 |
| WO | WO 2015-100020 | 7/2015 |
| WO | WO 2015-100220 | 7/2015 |
| WO | WO 2017-136188 | 8/2017 |
| WO | WO 2018-080704 | 5/2018 |
| WO | WO 2018-080705 | 5/2018 |
| WO | WO 2018-080755 | 5/2018 |
| WO | WO 2018-080756 | 5/2018 |
| WO | WO 2018-080784 | 5/2018 |
| WO | WO 2018-080799 | 5/2018 |

OTHER PUBLICATIONS

Rampal, "Comparing the Magnetic Abrasives by Investigating the Surface Finish", Journal of Engineering, Computers & Applied Sciences (JEC&AS), Oct. 2012, vol. 1, No. 1, pp. 20-24.

Sodium and Potassium Silicates, PQ Europe, Oct. 2004, 16 pages.

International Search Report for PCT International Application No. PCT/US2017/053684, dated Jan. 4, 2018, 4 pages.

Extended European Search Report, EP 17 86 4554, dated Jun. 3, 2020, 2 pages.

* cited by examiner

MAGNETIZABLE ABRASIVE PARTICLES AND ABRASIVE ARTICLES INCLUDING THEM

TECHNICAL FIELD

The present disclosure broadly relates to abrasive particles, abrasive articles, and methods of making them.

BACKGROUND

Various types of abrasive articles are known in the art. For example, coated abrasive articles generally have abrasive particles adhered to a backing by a resinous binder material. Examples include sandpaper and structured abrasives having precisely shaped abrasive composites adhered to a backing. The abrasive composites generally include abrasive particles and a resinous binder.

Bonded abrasive particles include abrasive particles retained in a binder matrix that can be resinous or vitreous. Examples include, grindstones, cutoff wheels, hones, and whetstones.

Precise placement and orientation of abrasive particles in abrasive articles such as, for example, coated abrasive articles and bonded abrasive articles has been a source of continuous interest for many years.

For example, coated abrasive articles have been made using techniques such as electrostatic coating of abrasive particles have been used to align crushed abrasive particles with the longitudinal axes perpendicular to the backing. Likewise, shaped abrasive particles have been aligned by mechanical methods as disclosed in U.S. Pat. Appl. Publ. No. 2013/0344786 A1 (Keipert).

Precise placement and orientation of abrasive particles in bonded abrasive articles has been described in the patent literature. For example, U.S. Pat. No. 1,930,788 (Buckner) describes the use of magnetic flux to orient abrasive grain having a thin coating of iron dust in bonded abrasive articles. Likewise, British (GB) Pat. No. 396,231 (Buckner) describes the use of a magnetic field to orient abrasive grain having a thin coating of iron or steel dust to orient the abrasive grain in bonded abrasive articles. Using this technique, abrasive particles were radially oriented in bonded wheels.

U.S. Pat. Appl. Publ. No. 2008/0289262 A1 (Gao) discloses equipment for making abrasive particles in even distribution, array pattern, and preferred orientation. Using electric current to form a magnetic field causing acicular soft magnetic metallic sticks to absorb or release abrasive particles plated with soft magnetic materials.

SUMMARY

The present inventors have discovered that magnetizable abrasive particles with incomplete magnetizable layers according to the present disclosure can be manipulated using magnetic fields in ways that differ from abrasive particles having layers over their entire surface to provide various abrasive articles.

In one aspect, the present disclosure provides a magnetizable abrasive particle comprising a ceramic body having an outer surface, and a magnetizable layer disposed on a portion, but not the entirety, of the outer surface.

In another aspect, the present disclosure provides a plurality of magnetizable abrasive particles according to the present disclosure.

In yet another aspect, the present disclosure provides a plurality of magnetizable abrasive particles according to the present disclosure retained in a binder material.

As used herein:

The term "ceramic" refers to any of various hard, brittle, heat- and corrosion-resistant materials made of at least one metallic element (which may include silicon) combined with oxygen, carbon, nitrogen, or sulfur. Ceramics may be crystalline or polycrystalline, for example.

The term "ferrimagnetic" refers to materials (in bulk) that exhibit ferrimagnetism. Ferrimagnetism is a type of permanent magnetism that occurs in solids in which the magnetic fields associated with individual atoms spontaneously align themselves, some parallel, or in the same direction (as in ferromagnetism), and others generally antiparallel, or paired off in opposite directions (as in antiferromagnetism). The magnetic behavior of single crystals of fenimagnetic materials may be attributed to the parallel alignment; the diluting effect of those atoms in the antiparallel arrangement keeps the magnetic strength of these materials generally less than that of purely ferromagnetic solids such as metallic iron. Ferrimagnetism occurs chiefly in magnetic oxides known as ferrites. The spontaneous alignment that produces ferrimagnetism is entirely disrupted above a temperature called the Curie point, characteristic of each ferrimagnetic material. When the temperature of the material is brought below the Curie point, ferrimagnetism revives.

The term "ferromagnetic" refers to materials (in bulk) that exhibit ferromagnetism. Ferromagnetism is a physical phenomenon in which certain electrically uncharged materials strongly attract others. In contrast to other substances, ferromagnetic materials are magnetized easily, and in strong magnetic fields (e.g., greater than 1000 gauss (1 kG), preferably greater than 3 kG, more preferably greater than 5 kG), and more preferably greater than 7 kG) the magnetization approaches a definite limit called saturation. When a field is applied and then removed, the magnetization does not return to its original value. This phenomenon is referred to as hysteresis. When heated to a certain temperature called the Curie point, which is generally different for each substance, ferromagnetic materials lose their characteristic properties and cease to be magnetic; however, they become ferromagnetic again on cooling.

The terms "magnetic" means being ferromagnetic or ferrimagnetic at 20° C., or capable of being made so, unless otherwise specified.

The term "magnetizable" means that the item being referred to is magnetic or can be made magnetic using an applied magnetic field, and preferably has a magnetic moment of at least 0.001 electromagnetic units (emu), more preferably at least 0.005 emu, more preferably 0.01 emu, up to an including 0.1 emu, although this is not a requirement.

The term "magnetic field" refers to magnetic fields that are not generated by any astronomical body or bodies (e.g., Earth or the sun). In general, magnetic fields used in practice of the present disclosure have a field strength in the region of the magnetizable abrasive particles being oriented of at least about 10 gauss (1 mT), preferably at least about 100 gauss (10 mT), and more preferably at least about 1000 gauss (0.1 T).

The term "magnetizable" means capable of being magnetized or already in a magnetized state.

The term "shaped ceramic body" refers to a ceramic body that has been intentionally shaped (e.g., extruded, die cut, molded, screen-printed) at some point during its preparation such that the resulting ceramic body is non-randomly shaped. The term "shaped ceramic body" as used herein excludes ceramic bodies obtained by a mechanical crushing or milling operation.

The terms "precisely-shaped ceramic body" refers to a ceramic body wherein at least a portion of the ceramic body has a predetermined shape that is replicated from a mold cavity used to form a precursor precisely-shaped ceramic body that is sintered to form the precisely-shaped ceramic body. A precisely-shaped ceramic body will generally have a predetermined geometric shape that substantially replicates the mold cavity that was used to form the shaped abrasive panicle.

The term "length" refers to the longest dimension of an object.

The term "width" refers to the longest dimension of an object that is perpendicular to its length.

The term "thickness" refers to the longest dimension of an object that is perpendicular to both of its length and width.

The term "aspect ratio" refers to the ratio length/thickness of an object.

The term "substantially" means within 35 percent (preferably within 30 percent, more preferably within 25 percent, more preferably within 20 percent more preferably within 10 percent, and more preferably within 5 percent) of the attribute being referred to.

Features and advantages of the present disclosure will be further understood upon consideration of the detailed description as well as the appended claims.

Figure 1:
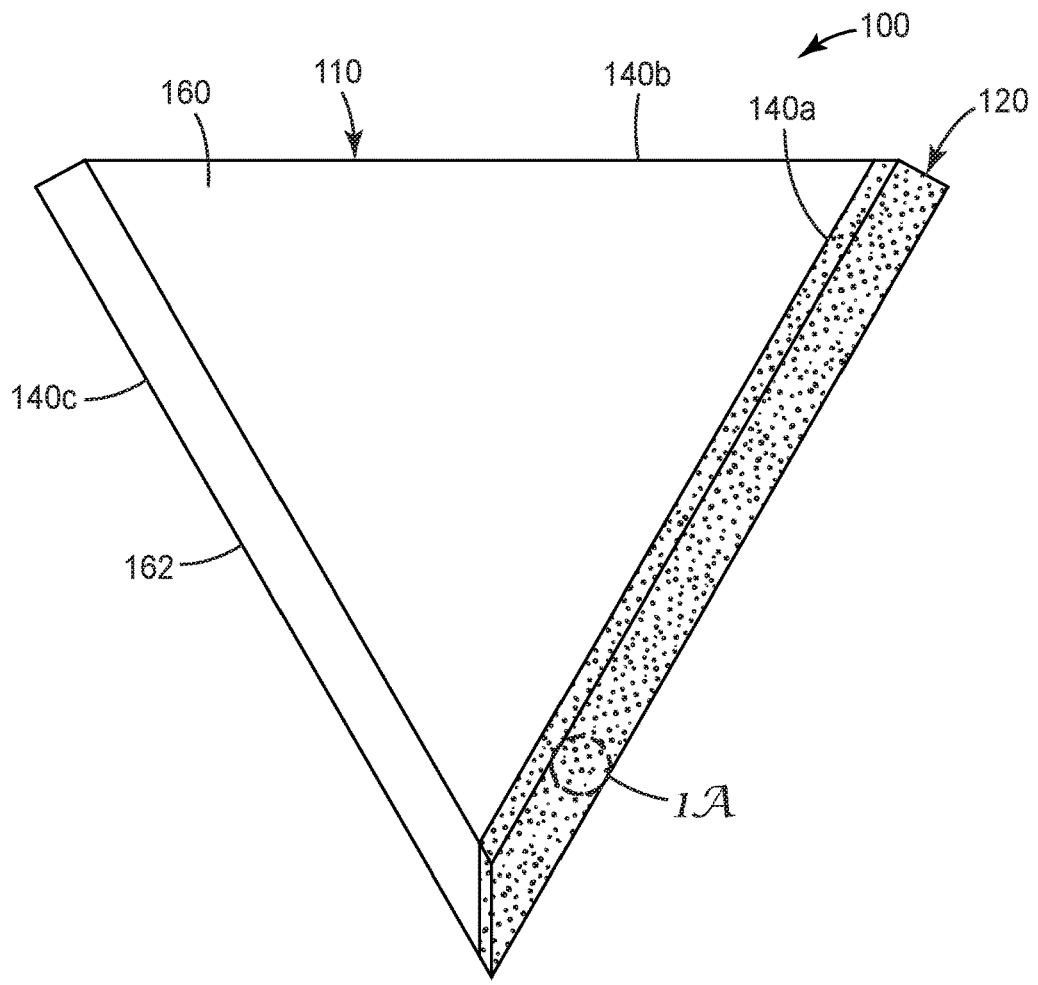
FIG. 1 is a schematic perspective view of an exemplary magnetizable abrasive particle 100 according to one embodiment of the present disclosure.

FIG. A is an enlarged view of region 1A in FIG. 1.

Figure 2:
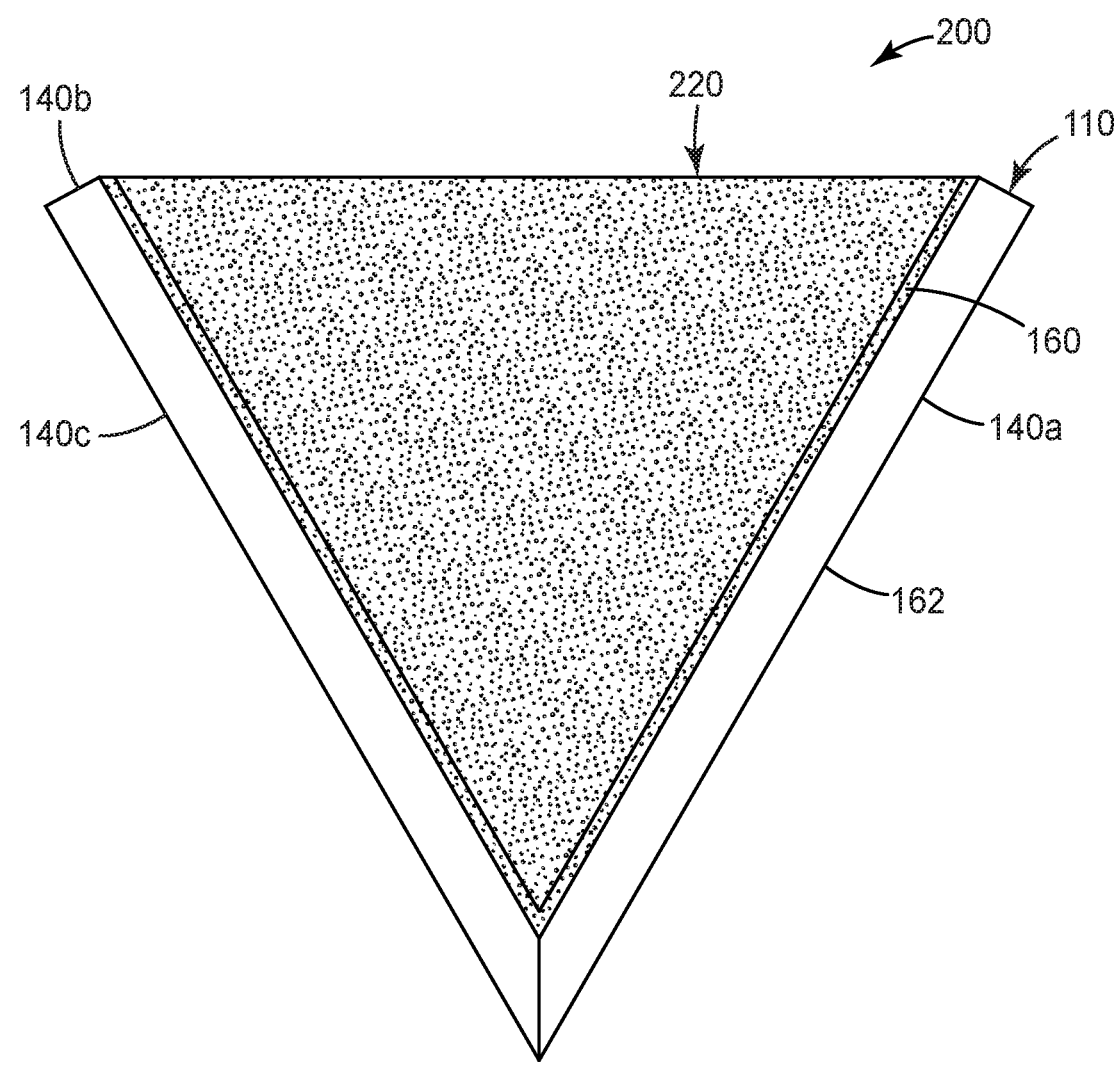

FIG. 2 is a schematic perspective view of an exemplary magnetizable abrasive particle 200 according to one embodiment of the present disclosure.

Figure 3:
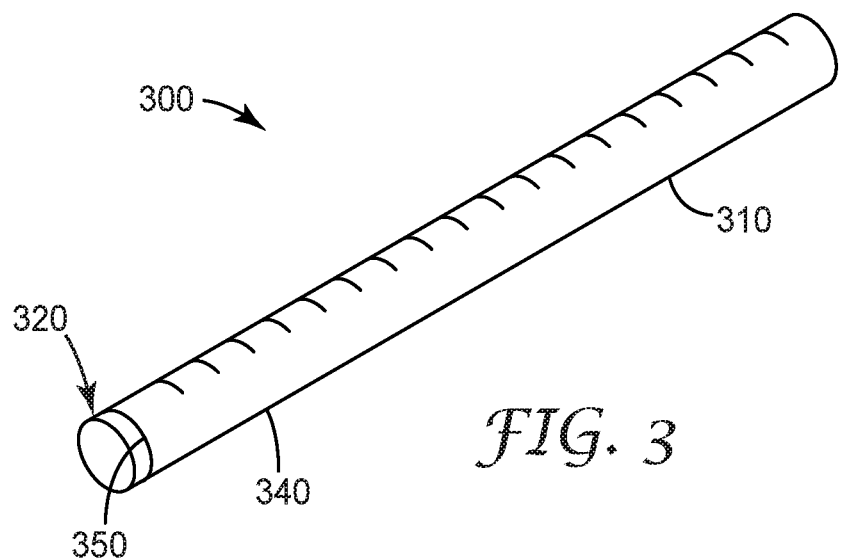

FIG. 3 is a schematic perspective view of an exemplary magnetizable abrasive particle 300 according to one embodiment of the present disclosure.

Figure 4:
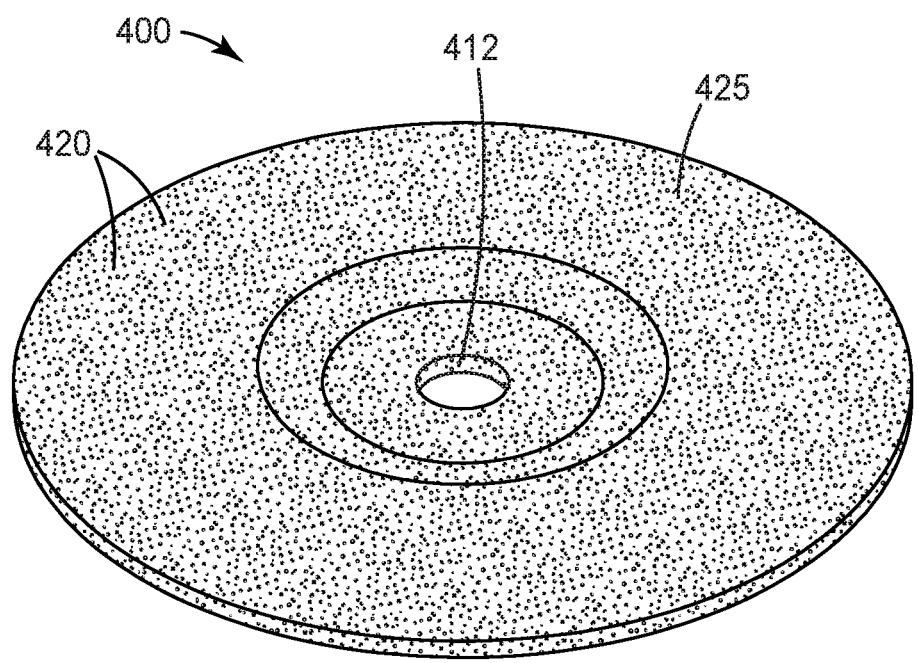

FIG. 4 is a perspective view of an exemplary depressed center grinding wheel 400 according to the present disclosure.

Figure 5:
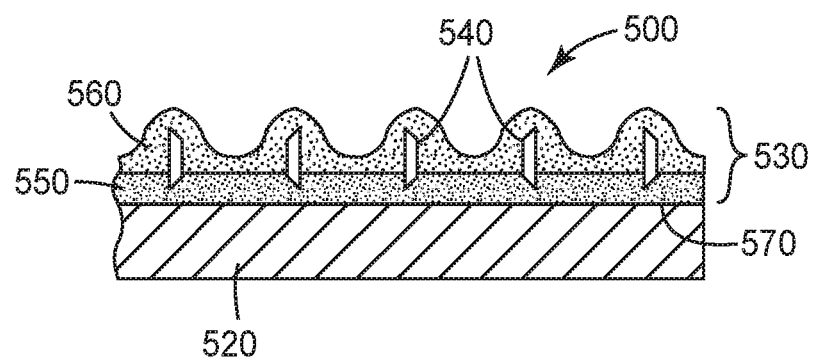

FIG. 5 is a side view of an exemplary coated abrasive article 500 according to the present disclosure.

Figure 6:
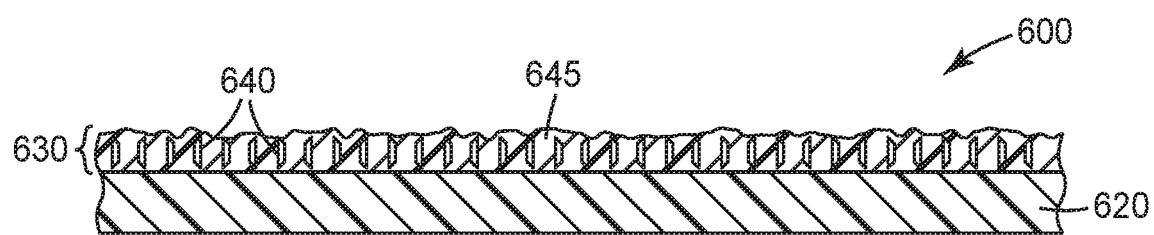

FIG. 6 is a side view of an exemplary coated abrasive article 600 according to the present disclosure.

Figure 7A:
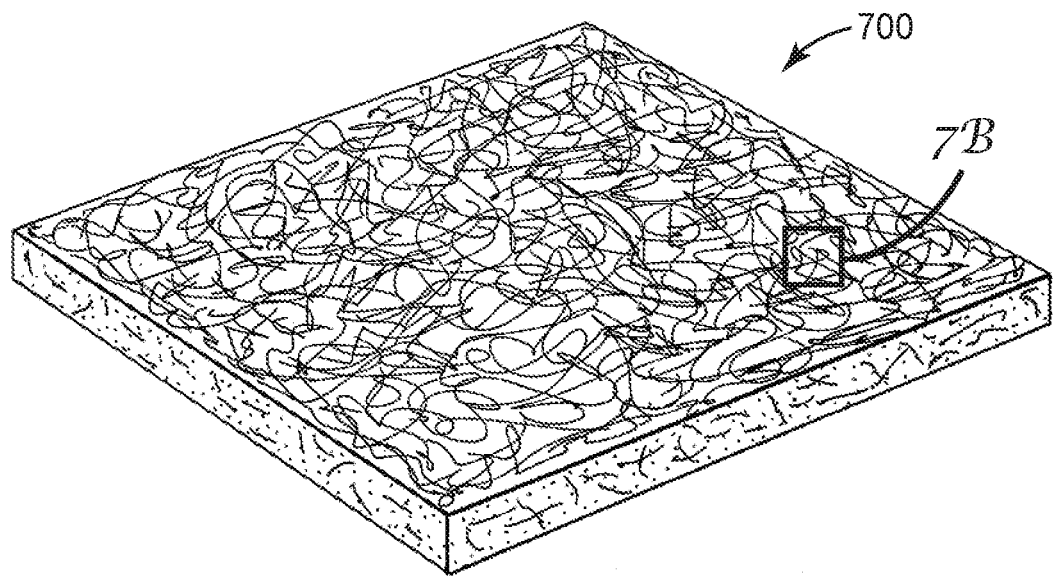

FIG. 7A is a perspective view of an exemplary nonwoven abrasive article 700 according to the present disclosure.

Figure 7B:
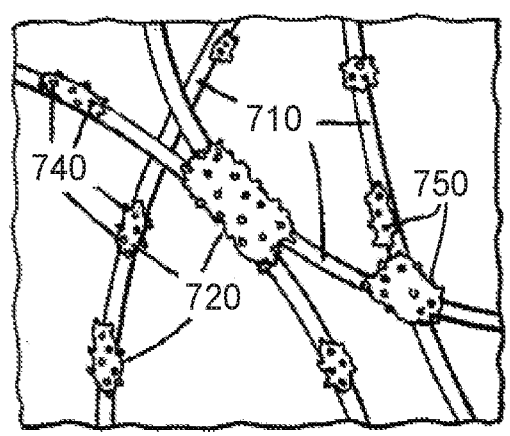

FIG. 7B is an enlarged view of region 7B in FIG. 7A.

Figure 8:

FIG. 8 is an optical micrograph of a magnetizable shaped abrasive particle of Example 1 oriented in a magnetic field.

Figure 9:
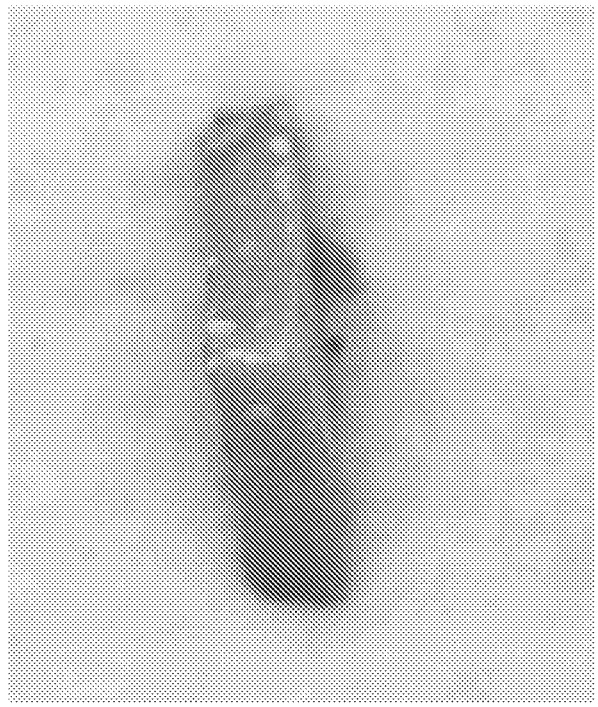

FIG. 9 is an optical micrograph of a magnetizable shaped abrasive particle of Example 1 oriented in a magnetic field.

Figure 10:
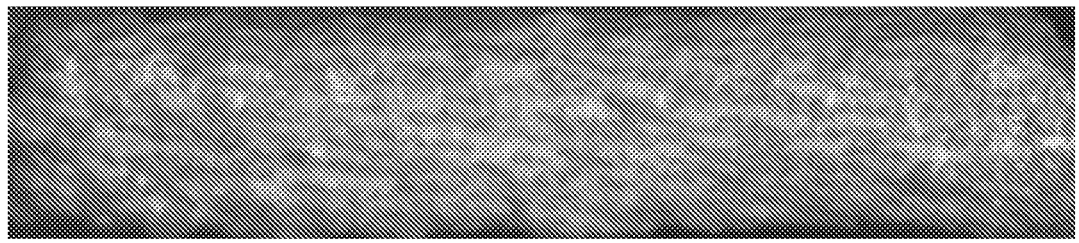

FIG. 10 is an optical micrograph of a magnetizable shaped abrasive particle of Example 2.

Figure 11:
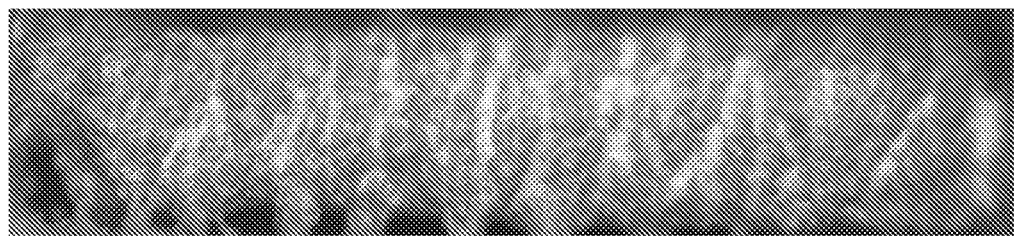

FIG. 11 is an optical micrograph of a magnetizable shaped abrasive particle prepared in Example 3.

Figure 12:
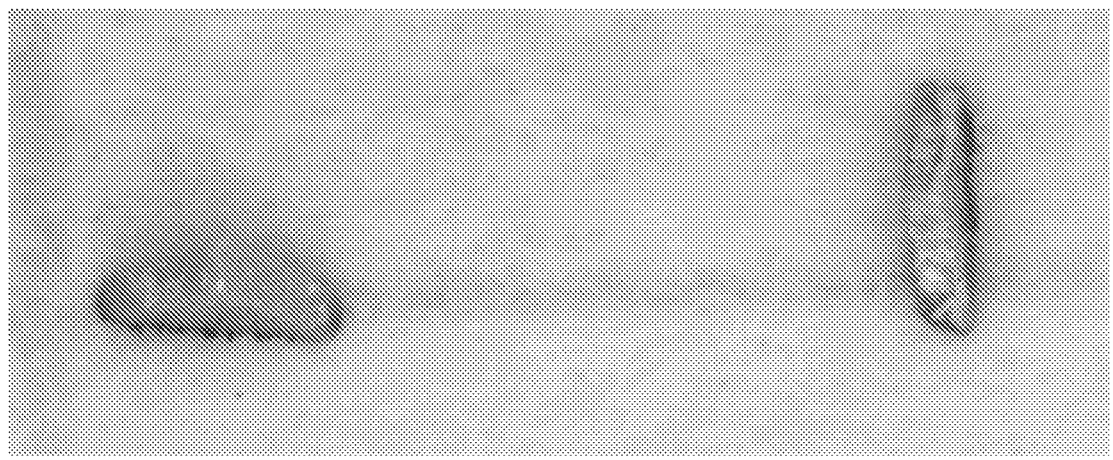

FIG. 12 is an optical micrograph of magnetizable shaped abrasive particles prepared in Example 2 (right) and Example 3 (left).

Figure 13A:
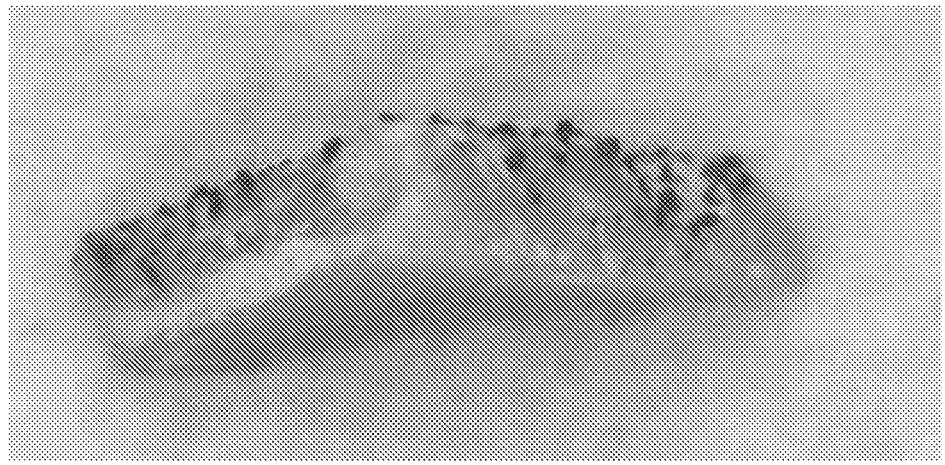
Figure 13B:
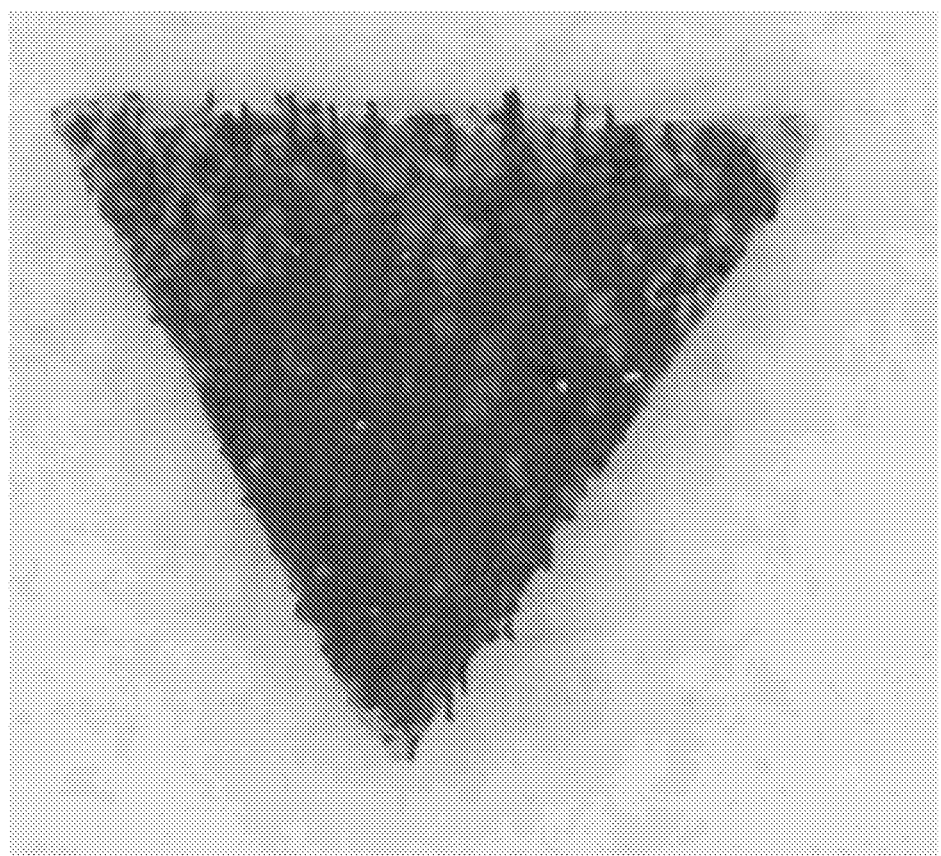

FIGS. 13A and 13B are optical micrographs of magnetizable shaped abrasive particles of Example 4 oriented in different regions of a magnetic field.

Figure 14A:
Figure 14B:
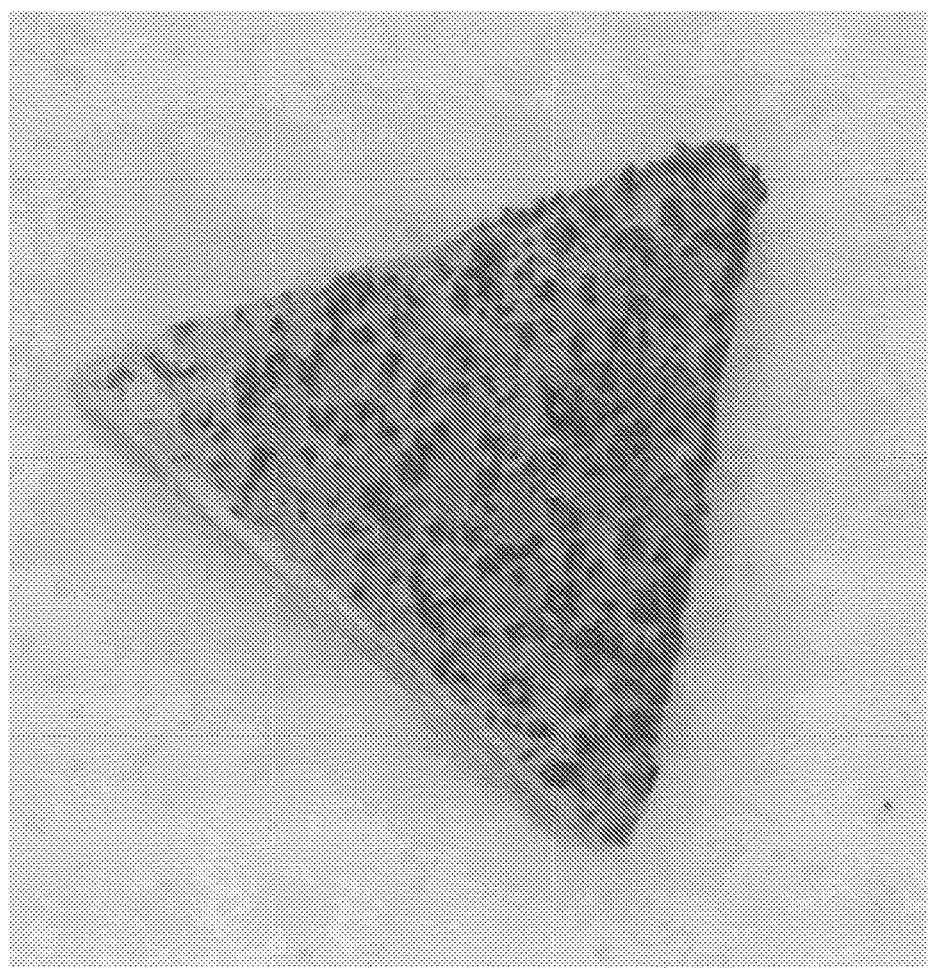

FIGS. 14A and 14B are optical micrographs of magnetizable shaped abrasive particles of Example 5 oriented in different regions of a magnetic field.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Magnetizable abrasive particles according to the present disclosure may have various different basic configurations shown in FIGS. 1-3, for example.

Figure 1A:
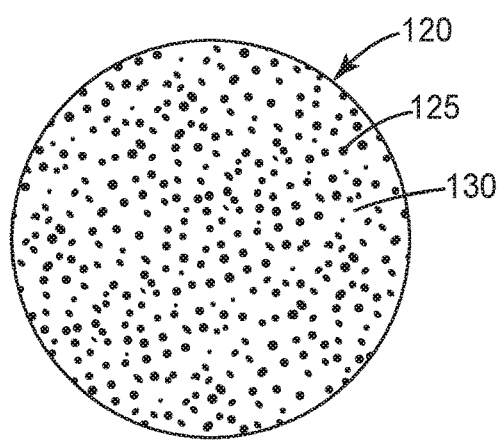

Referring now to FIGS. 1 and 1A, magnetizable abrasive particle 100 comprises precisely-shaped ceramic body 110 and magnetizable layer 120. Magnetizable layer 120 preferably comprises magnetizable particles 125 retained in a binder matrix 130 (also referred to simply as "binder"). Ceramic body 110 has two opposed major surfaces 160, 162 connected to each other by three side surfaces 140a. 140b, 140c. Magnetizable layer 120 is disposed on side surface 140a of ceramic body 110. In this configuration, the magnetizable layer may optionally extend somewhat onto other surfaces of the shaped ceramic abrasive body, but does not extend to cover a majority of any other surface of the shaped ceramic body. As shown, magnetizable layer 120 is coextensive with side surface 140a. Advantageously, magnetizable abrasive particles of this type can be preferentially aligned with the magnetizable layer-coated surface parallel to magnetic field lines of force.

In a second configuration, shown in FIG. 2, magnetizable abrasive particle 200 comprises precisely-shaped ceramic body 110 and magnetizable layer 220. Magnetizable layer 220 preferably comprises magnetizable particles 125 (see FIG. 1A) retained in binder matrix 130 (see FIG. 1A). Ceramic body 110 has two opposed major surfaces 160, 162 connected to each other by three side surfaces 140a. 140b. 140c. Magnetizable layer 220 is disposed on major surface 160 of ceramic body 110. In this configuration, the magnetizable layer may optionally extend somewhat onto other surfaces of the shaped ceramic abrasive body, but does not extend to cover a majority of any other surface of the shaped ceramic body. As shown, magnetizable layer 220 is coextensive with major surface 160. Advantageously, magnetizable abrasive particles of this type preferentially align with the magnetic field lines of force resulting in an upright orientation of the magnetizable abrasive particles, when disposed centrally near the magnet (i.e., away to from field curvature at the magnet edges).

In a third configuration, shown in FIG. 3, magnetizable abrasive particle 300 comprises shaped ceramic abrasive body 310 and magnetizable layer 320. Magnetizable layer 320 preferably comprises magnetizable particles 125 (see FIG. 1A) retained in binder matrix 130 (see FIG. 1A). Ceramic body 310 is rod-shaped. Magnetizable layer 320 is disposed on end surface 350 of ceramic body 310. In this configuration, the magnetizable layer may optionally extend somewhat onto side surface 340 of shaped ceramic body 310, but does not extend to cover a majority of any other surface of the shaped ceramic body. As shown, magnetizable layer 320 is coextensive with end surface 350. Advantageously, magnetizable abrasive particles of this type preferentially align their longitudinal axes along the magnetic field lines of force resulting in the longitudinal axes of respective magnetizable abrasive particles being oriented.

In general, since orientation of the magnetic field lines tends to be different at the center and edge of a magnet it is also possible to create various desired orientations of the magnetizable abrasive particles during their inclusion into an abrasive article.

The magnetizable layer may be a unitary magnetizable material, or it may comprise magnetizable particles in a binder matrix. Suitable binders may be vitreous or organic. For example, as described for the binder matrix 130 hereinbelow. The binder matrix may be, for example selected from those vitreous and organic binders listed hereinabove, for example. The ceramic body may comprise any ceramic material (preferably a ceramic abrasive material), for example, selected from among the ceramic (i.e., not including diamond) abrasive materials listed hereinbelow. The magnetizable layer may be disposed on the ceramic body by any suitable method such as, for example, dip coating, spraying, painting, physical vapor deposition, and powder coating. Individual magnetizable abrasive particles may have magnetizable layers with different degrees of coverage and/or locations of coverage. The magnetizable layer is preferably essentially free of (i.e., containing less than 5 weight percent of, preferably containing less than 1 weight percent of) ceramic abrasive materials used in the ceramic body.

The magnetizable layer may consist essentially of magnetizable materials (e.g., >99 to 100 percent by weight of vapor coated metals and alloys thereof), or it may contain magnetic particles retained in a binder matrix. The binder matrix of the magnetizable layer, if present, can be inorganic (e.g., vitreous) or organic resin-based, and is typically formed from a respective binder precursor.

Magnetizable abrasive particles according to the present disclosure can be prepared, for example, by applying a magnetizable layer or precursor thereof to the ceramic body. Magnetizable layers may be provided by physical vapor deposition as discussed hereinbelow. Magnetizable layer precursors may be provided as a dispersion or slurry in a liquid vehicle. The dispersion or slurry vehicle and can be made by simple mixing of its components (e.g., magnetizable particles, optional binder precursor, and liquid vehicle), for example. Exemplary liquid vehicles include water, alcohols (e.g., methanol, ethanol, propanol, butanol, ethylene glycol monomethyl ether), ethers (e.g., glyme, diglyme), and combinations thereof. The dispersion or slurry may contain additional components such as, for example, dispersant, surfactant, mold release agent, colorant, defoamer, and rheology modifier. Typically, after coating onto the ceramic bodies the magnetizable layer precursor is dried to remove most or all of the liquid vehicle, although this is not a requirement. If a curable binder precursor is used, then a curing step (e.g., heating and/or exposure to actinic radiation) generally follows to provide the magnetizable layer.

Vitreous binder may be produced from a precursor composition comprising a mixture or combination of one or more raw materials that when heated to a high temperature melt and/or fuse to form an integral vitreous binder matrix. The vitreous binder may be formed, for example, from frit. A frit is a composition that has been pre-fired before its use as a vitreous binder precursor composition for forming the vitreous binder of the magnetizable abrasive particle.

As used herein, the term "frit" is a generic term for a material that is formed by thoroughly blending a mixture comprising one or more frit forming components, followed by heating (also referred to as pre-firing) the mixture to a temperature at least high enough to melt it: cooling the resulting glass, and crushing it. The crushed material can then be screened to a very fine powder.

Examples of suitable glasses for the vitreous binder and the frit for making it include silica glass, silicate glass, borosilicate glass, and combinations thereof. A silica glass is typically composed of 100 percent by weight of silica. In some embodiments, the vitreous binder is a glass that include metal oxides or oxides of metalloids, for example, aluminum oxide, silicon oxide, boron oxide, magnesium oxide, sodium oxide, manganese oxide, zinc oxide, calcium oxide, barium oxide, lithium oxide, potassium oxide, titanium oxide, metal oxides that can be characterized as pigments (e.g., cobalt oxide, chromium oxide, and iron oxide), and mixtures thereof.

Examples of suitable ranges for the vitreous binder and/or vitreous binder precursor, include, based on the total weight of the vitreous binder and/or vitreous binder precursor: 25 to 90% by weight, preferably 35 to 85% by weight of $SiO_2$; 0 to 40% by weight, preferably 0 to 30% by weight, of $B_2O_3$; 0 to 40% by weight, preferably 5 to 30% by weight, of $Al_2O_3$; 0 to 5% by weight, preferably 0 to 3% by weight, of $Fe_2O_3$; 0 to 5% by weight, preferably 0 to 3% by weight, of $TiO_2$; 0 to 20% by weight, preferably 0 to 10% by weight, of CaO; 0 to 20% by weight, preferably 1 to 10% by weight, of MgO; 0 to 20% by weight, preferably 0 to 10% by weight, of $K_2O$; 0 to 25% by weight, preferably 0 to 15% by weight, of $Na_2O$; 0 to 20% by weight preferably 0 to 12% by weight, of $Li_2O$; 0 to 10% by weight, preferably 0 to 3% by weight, of ZnO; 0 to 10% by weight, preferably 0 to 3% by weight, of BaO; and 0 to 5% by weight preferably 0 to 3% by weight, of metallic oxides (e.g., CoO, $Cr_2O_3$ or other pigments).

An example of a suitable silicate glass composition comprises about 70 to about 80 percent by weight of silica, about 10 to about 20 percent sodium oxide, about 5 to about 10 percent calcium oxide, about 0.5 to about 1 percent aluminum oxide, about 2 to about 5 percent magnesium oxide, and about 0.5 to about 1 percent potassium oxide, based on the total weight of the glass frit. Another example of a suitable silicate glass composition includes about 73 percent by weight of silica, about 16 percent by weight of sodium oxide, about 5 percent by weight of calcium oxide, about 1 percent by weight of aluminum oxide, about 4 percent by weight of magnesium oxide, and about 1 percent by weight of potassium oxide, based on the total weight of the glass frit. In some embodiments, the glass matrix comprises an alumina-borosilicate glass comprising $SiO_2$, $B_2O_3$, and $Al_2O_3$. An example of a suitable borosilicate glass composition comprises about 50 to about 80 percent by weight of silica, about 10 to about 30 percent by weight of boron oxide, about 1 to about 2 percent by weight of aluminum oxide, about 0 to about 10 percent by weight of magnesium oxide, about 0 to about 3 percent by weight of zinc oxide, about 0 to about 2 percent by weight of calcium oxide, about 1 to about 5 percent by weight of sodium oxide, about 0 to about 2 percent by weight of potassium oxide, and about 0 to about 2 percent by weight of lithium oxide, based on the total weight of the glass frit. Another example of a suitable borosilicate glass composition includes about 52 percent by weight of silica, about 27 percent by weight of boron oxide, about 9 percent by weight of aluminum oxide, about 8 percent by weight of magnesium oxide, about 2 percent by weight of zinc oxide, about 1 percent by weight of calcium oxide, about 1 percent by weight of sodium oxide, about 1 percent by weight of potassium oxide, and about 1 percent by weight of lithium oxide, based on the total weight of the glass frit. Other examples suitable borosilicate glass composition include, based upon weight, 47.61% $SiO_2$, 16.65% $Al_2O_3$, 0.38% $Fe_2O_3$, 0.35% $TiO_2$, 1.58% CaO, 0.10% MgO, 9.63% $Na_2O$, 2.86% $K_2O$, 1.77% $Li_2O$, 19.03% $B_2O_3$, 0.02% $MnO_2$, and 0.22% $P_2O_5$; and 63% $SiO_2$, 12% $Al_2O_3$, 1.2% CaO, 6.3% $Na_2O$, 7.5% $K_2O$, and 10% $B_2O_3$. In some embodiments, a useful alumina-borosilicate glass composition comprises, by weight, about 18% $B_2O_3$, 8.5% $Al_2O_3$, 2.8% BaO, 1.1% CaO, 2.1% $Na_2O$, 1.0% $Li_2O$, with the balance being $SiO_2$. Such an alumina-borosilicate glass, having a particle size of less than about 45 mm, is commercially available from Specialty Glass Incorporated. Oldsmar, Fla.

Glass frit for making glass-ceramics may be selected from the group consisting of magnesium aluminosilicate, lithium aluminosilicate, zinc aluminosilicate, calcium aluminosilicate, and combinations thereof. Known crystalline ceramic phases that can form glasses within the above listed systems include: cordierite ($2MgO.2Al_2O_3.5SiO_2$), gehlenite ($2CaO.Al_2O_3.SiO_2$), anorthite ($2CaO.Al_2O_3.2SiO_2$), hardystonite ($2CaO.ZnO.2SiO_2$), akeranite ($2CaO.MgO.2SiO_2$), spodumene ($2Li_2O.A_2O_3.4SiO_2$), willemite ($2ZnO.SiO_2$), and gahnite ($ZnO.A_2O_3$). Glass frit for making glass-ceramic may comprise nucleating agents. Nucleating agents are known to facilitate the formation of crystalline ceramic phases in glass-ceramics. As a result of specific processing techniques, glassy materials do not have the long range order that crystalline ceramics have. Glass-ceramics are the result of controlled heat-treatment to produce. In some cases, over 90% crystalline phase or phases with the remaining non-crystalline phase filling the grain boundaries. Glass ceramics combine the advantage of both ceramics and glasses and offer durable mechanical and physical properties.

Frit useful for forming vitreous binder may also contain frit binders (e.g., feldspar, borax, quartz, soda ash, zinc oxide, whiting, antimony trioxide, titanium dioxide, sodium silicofluoride, flint, cryolite, boric acid, and combinations thereof) and other minerals (e.g., clay, kaolin, wollastonite, limestone, dolomite, chalk, and combinations thereof).

Vitreous binder in the magnetizable abrasive particles may be selected, for example, based on a desired coefficient of thermal expansion (CTE). Generally, it is useful for the vitreous binder and abrasive particles to have similar CTEs, for example, ±100%, 50%, 40%, 25%, or 20% of each other. The CTE of fused alumina is typically about $8\times10^6$/Kelvin (K). A vitreous binder may be selected to have a CTE in a range from $4\times10^{-6}$/K to $16\times10^{-6}$/K. An example of a glass frit for making a suitable vitreous binder is commercially available, for example, as F245 from Fusion Ceramics, Carrollton, Ohio.

During manufacture, the vitreous binder precursor, in a powder form, may be mixed with a temporary binder, typically an organic binder (e.g., starch, sucrose, mannitol), which burns out during firing of the vitreous binder precursor. Firing/sintering of vitreous binders can be done, for example, in a kiln or tube furnace using techniques known in the art.

Organic binders (e.g., crosslinked organic polymers) are generally prepared by curing (i.e., crosslinking) a resinous organic binder precursor. Examples of suitable organic binder precursors include thermally-curable resins and radiation-curable resins, which may be cured, for example, thermally and/or by exposure to radiation. Exemplary organic binder precursors include glues, phenolic resins, aminoplast resins, urea-formaldehyde resins, melamine-formaldehyde resins, urethane resins, acrylic resins (e.g., aminoplast resins having pendant α,β-unsaturated groups, acrylated urethanes, acrylated epoxy resins, acrylated isocyanurates), acrylic monomer/oligomer resins, epoxy resins (including bismaleimide and fluorene-modified epoxy resins), isocyanurate resins, an combinations thereof. Curatives such as thermal initiators, catalysts, photoinitiators, hardeners, and the like may be added to the organic binder precursor, typically selected and in an effective amount according to the resin system chosen.

Conditions for curing organic binder precursors may include heating in an oven or with infrared radiation and/or actinic radiation (e.g., in the case of photoinitiated cure) using techniques known in the art.

In some embodiments, the magnetizable layer may be deposited using a vapor deposition technique such as, for example, physical vapor deposition (PVD) including magnetron sputtering. PVD metallization of various metals, metal oxides and metallic alloys is disclosed in, for example, U.S. Pat. No. 4,612,242 (Vesley) and U.S. Pat. No. 7,727,931 (Brey et al.). Magnetizable layers can typically be prepared in this general manner, but care should be generally taken to prevent the vapor coating from covering the entire surface of the shaped ceramic body. The may be accomplished by masking a portion of the ceramic body to prevent vapor deposition.

Examples of metallic materials that may be vapor coated include stainless steels, nickel, cobalt. Exemplary useful magnetizable particles/materials may comprise: iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (typically about 85:9:6 by weight) marketed as Sendust alloy; Heusler alloys (e.g., Cu,MnSn); manganese bismuthide (also known as Bismanol); rare earth magnetizable materials such as gadolinium, dysprosium, holmium, europium oxide, and alloys of samarium and cobalt (e.g., $SmCo_5$); MnSb; ferrites such as ferrite, magnetite, zinc ferrite; nickel ferrite; cobalt ferrite, magnesium ferrite, barium ferrite, and strontium ferrite; and combinations of the foregoing. In some preferred embodiments, the magnetizable material comprises at least one metal selected from iron, nickel, and cobalt, an alloy of two or more such metals, or an alloy of at one such metal with at least one element selected from phosphorus and manganese. In some preferred embodiments, the magnetizable material is an alloy containing 8 to 12 weight percent (wt. %) aluminum, 15 to 26 wt. % nickel, 5 to 24 wt. % cobalt, up to 6 wt. % copper, up to 1 wt. % titanium, wherein the balance of material to add up to 100 wt. % is iron. Alloys of this type are available under the trade designation "ALNICO".

Useful abrasive materials that can be used as ceramic bodies include, for example, fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minn., black silicon carbide, green silicon carbide, titanium diboride, boron carbide, tungsten carbide, titanium carbide, cubic boron nitride, garnet, fused alumina zirconia, sol-gel derived ceramics (e.g., alumina ceramics doped with chromia, ceria, zirconia, titania, silica, and/or tin oxide), silica (e.g., quartz, glass beads, glass bubbles and glass fibers), feldspar, or flint. Examples of sol-gel derived crushed ceramic particles can be found in U.S. Pat. No. 4,314,827 (Leitheiser et al.), U.S.

Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.).

Preferably, the ceramic bodies have a Mohs hardness of at least 6, preferably at least 7, or even at least 8.

Further details concerning methods of making sol-gel-derived ceramic particles suitable or use as ceramic bodies can be found in, for example, U.S. Pat. No. 4,314,827 (Leitheiser), U.S. Pat. No. 5,152,917 (Pieper et al.), U.S. Pat. No. 5,213,591 (Celikkaya et al.), U.S. Pat. No. 5,435,816 (Spurgeon et al.), U.S. Pat. No. 5,672,097 (Hoopman et al.). U.S. Pat. No. 5,946,991 (Hoopman et al.). U.S. Pat. No. 5,975,987 (Hoopman et al.), and U.S. Pat. No. 6,129,540 (Hoopman et al.), and in U.S. Publ. Pat. Appln. Nos. 2009/0165394 A1 (Culler et al.) and 2009/0169816 A1 (Erickson et al.).

The ceramic body may be shaped (e.g., precisely-shaped) or random (e.g., crushed). Shaped abrasive particles and precisely-shaped ceramic bodies may be prepared by a molding process using sol-gel technology as described in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina particles that have been formed in a specific shape, then crushed to form shards that retain a portion of their original shape features. In some embodiments, the ceramic bodies are precisely-shaped (i.e., the ceramic bodies have shapes that are at least partially determined by the shapes of cavities in a production tool used to make them).

Exemplary shapes of ceramic bodies include crushed, pyramids (e.g., 3-, 4-, 5-, or 6-sided pyramids), truncated pyramids (e.g., 3-, 4-, 5-, or 6-sided truncated pyramids), cones, truncated cones, rods (e.g., cylindrical, vermiform), and prisms (e.g., 3-, 4-, 5-, or 6-sided prisms).

Details concerning such shaped ceramic bodies and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat Appl. Publ. Nos. 2012/0227333 (Adefris et al.); 2013/0040537 (Schwabel et al.); and 2013/0125477 (Adefris).

Exemplary magnetizable materials that may be suitable for use in magnetizable particles may comprise: iron; cobalt: nickel; various alloys of nickel and iron marketed as Permalloy in various grades; various alloys of iron, nickel and cobalt marketed as Femico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (typically about 85:9:6 by weight) marketed as Sendust alloy; Heusler alloys (e.g., Cu,MnSn); manganese bismuthide (also known as Bismanol); rare earth magnetizable materials such as gadolinium, dysprosium, holmium, europium oxide, alloys of neodymium, iron and boron (e.g., $Nd_2Fe_{14}B$), and alloys of samarium and cobalt (e.g., $SmCo_5$); MnSb; $MnOFe_2O_3$; $Y_3Fe_5O_{12}$; $CrO_2$: MnAs: ferrites such as ferrite, magnetite: zinc ferrite; nickel fenite; cobalt ferrite, magnesium ferrite, barium ferrite, and strontium ferrite; yttrium iron garnet; and combinations of the foregoing. In some preferred embodiments, the magnetizable material comprises at least one metal selected from iron, nickel, and cobalt, an alloy of two or more such metals, or an alloy of at one such metal with at least one element selected from phosphorus and manganese. In some preferred embodiments, the magnetizable material is an alloy (e.g., Alnico alloy) containing 8 to 12 weight percent (wt %) aluminum, 15 to 26 wt. % nickel, 5 to 24 wt. % cobalt, up to 6 wt. % copper, up to I wt. % titanium, wherein the balance of material to add up to 100 wt % is iron.

The magnetizable particles may have any size, but are preferably much smaller than the ceramic bodies as judged by average particle diameter, preferably 4 to 2000 times smaller, more preferably 100 to 2000 times smaller, and even more preferably 500 to 2000 times smaller, although other sizes may also be used. In this embodiment, the magnetizable particles may have a Mohs hardness of 6 or less (e.g., 5 or less, or 4 or less), although this is not a requirement.

Magnetizable abrasive particles according to the present disclosure may be independently sized according to an abrasives industry recognized specified nominal grade. Exemplary abrasive industry recognized grading standards include those promulgated by ANSI (American National Standards Institute). FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F18, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JIS8, JIS12, JIS16, JIS24, JIS36, JIS46, JIS54, JIS60, JIS80, JIS100, JIS510, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the magnetizable abrasive particles can be graded to a nominal screened grade using U.S.A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the magnetizable abrasive particles pass through a test sieve meeting ASTM E-11 specifications for the number 18 sieve and are retained on a test sieve meeting ASTM E-11 specifications for the number 20 sieve. In one embodiment, the magnetizable abrasive particles have a particle size such that most of the particles pass through an 18 mesh test sieve and can be retained on a 20, 25, 30, 35, 40, 45, or 50 mesh test sieve. In various embodiments, the magnetizable abrasive particles can have a nominal screened grade of: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size can be used such as −90+100.

For production of abrasive articles, one or more magnets and/or electromagnets generating a magnetic field can optionally be used to place and/or orient the magnetizable abrasive particles prior to curing the binder (e.g., vitreous or organic) precursor to produce the abrasive article. The magnetic field may be substantially uniform over the magnetizable abrasive particles before they are fixed in position in the binder or continuous over the entire, or it may be uneven, or even effectively separated into discrete sections. Typically, the orientation of the magnetic field is configured to achieve alignment of the magnetizable abrasive particles according to a predetermined orientation.

Examples of magnetic field configurations and apparatuses for generating them are described in U.S. Pat. Appln. Publ. No. 2008/0289262 A1 (Gao) and U.S. Pat. No. 2,370,636 (Carlton), U.S. Pat. No. 2,857,879 (Johnson), U.S. Pat. No. 3,625,666 (James), U.S. Pat. No. 4,008,055 (Phaal), U.S. Pat. No. 5,181,939 (Neff), and British Pat No. (G.B.) 1 477 767 (Edenville Engineering Works Limited).

In some embodiments, magnetic field may be used to urge the magnetizable abrasive particles onto the make layer precursor (i.e., the binder precursor for the make layer) of a coated abrasive article while maintaining a vertical or inclined orientation relative to a horizontal backing. After at least partially curing the make layer precursor, the magnetizable abrasive particles are fixed in their placement and orientation. Alternatively or in addition, the presence or absence of strong magnetic field can be used to selectively placed the magnetizable abrasive particles onto the make layer precursor. An analogous process may be used for manufacture of slurry coated abrasive articles, except that the magnetic field acts on the magnetizable particles within the slurry. The above processes may also be carried out on nonwoven backings to make nonwoven abrasive articles.

Likewise, in the case of bonded abrasive article the magnetizable abrasive particles can be positioned and/or oriented within the corresponding binder precursor, which is then pressed and cured.

Magnetizable abrasive particles can be used in loose form (e.g., free-flowing or in a slurry) or they may be incorporated into various abrasive articles (e.g., coated abrasive articles, bonded abrasive articles, nonwoven abrasive articles, and/or abrasive brushes).

Magnetizable abrasive particles are useful, for example, in the construction of abrasive articles, including for example, coated abrasive articles (for example, conventional make and size coated abrasive articles, slurry coated abrasive articles, and structured abrasive articles), abrasive brushes, nonwoven abrasive articles, and bonded abrasive articles such as grinding wheels, hones and whetstones.

For example, FIG. 4 shows an exemplary embodiment of a Type 27 depressed-center grinding wheel 400 (i.e., an embodiment of a bonded abrasive article) according to one embodiment of the present disclosure. Center hole 412 is used for attaching bonded abrasive wheel 400 to, for example, a power driven tool (not shown). Bonded abrasive wheel 400 comprises shaped ceramic abrasive particles 420 according to the present disclosure retained in binder 425. Examples of suitable binders 425 include: organic binders such as epoxy binders, phenolic binders, aminoplast binders, and acrylic binders; and inorganic binders such as vitreous binders. Further details concerning suitable organic and inorganic binders can be found hereinabove in the discussion of binder matrices in the magnetizable layer.

Further details concerning the manufacture of bonded abrasive articles according to the present disclosure can be found in, for example U.S. Pat. No. 4,800,685 (Haynes et al.); U.S. Pat. No. 4,898,597 (Hay et al.); U.S. Pat. No. 4,933,373 (Moren): and U.S. Pat. No. 5,282,875 (Wood et al.).

In one exemplary embodiment of a coated abrasive article, the abrasive coat may comprise a make coat, a size coat, and magnetizable abrasive particles. Referring to FIG. 5, exemplary coated abrasive article 500 has backing 520 and abrasive layer 530. Abrasive layer 530, includes magnetizable abrasive particles 540 according to the present disclosure secured to backing 520 by make layer 550 and size layer 560, each comprising a respective binder (e.g., epoxy resin, urethane resin, phenolic resin, aminoplast resin, or acrylic resin) that may be the same or different.

In another exemplary embodiment of a coated abrasive article, the abrasive coat may comprise a cured slurry comprising a curable binder precursor and magnetizable abrasive particles according to the present disclosure. Referring to FIG. 6, exemplary coated abrasive article 600 has backing 620 and abrasive layer 630. Abrasive layer 630 includes magnetizable abrasive particles 640 and a binder 645 (e.g., epoxy resin, urethane resin, phenolic resin, aminoplast resin, acrylic resin).

Further details concerning the manufacture of coated abrasive articles according to the present disclosure can be found in, for example U.S. Pat. No. 4,314,827 (Leitheiser et al.), U.S. Pat. No. 4,652,275 (Bloecher et al.), U.S. Pat. No. 4,734,104 (Bmberg), U.S. Pat. No. 4,751,137 (Tumey et al.), U.S. Pat. No. 5,137,542 (Buchanan et al.), U.S. Pat. No. 5,152,917 (Pieper et al.), U.S. Pat. No. 5,417,726 (Stout et al.), U.S. Pat. No. 5,573,619 (Benedict et al.), U.S. Pat. No. 5,942,015 (Culler et al.), and U.S. Pat. No. 6,261,682 (Law).

Nonwoven abrasive articles typically include a porous (e.g., a lofty open porous) polymer filament structure having magnetizable abrasive particles bonded thereto by a binder. An exemplary embodiment of a nonwoven abrasive article according to the present invention is shown in FIGS. 7A and 7B. Nonwoven abrasive article 700 includes a lofty open low-density fibrous web formed of entangled filaments 710 impregnated with binder 720 (e.g., epoxy resin, urethane resin, phenolic resin, aminoplast resin, acrylic resin). Magnetizable abrasive particles 740 according to the present disclosure are dispersed throughout fibrous web 700 on exposed surfaces of filaments 710. Binder 720 coats portions of filaments 710 and forms globules 750, which may encircle individual filaments or bundles of filaments that adhere to the surface of the filament and/or collect at the intersection of contacting filaments, providing abrasive sites throughout the nonwoven abrasive article.

Further details concerning the manufacture of nonwoven abrasive articles according to the present disclosure can be found in, for example, U.S. Pat. No. 2,958,593 (Hoover et al.), U.S. Pat. No. 4,018.575 (Davis et al.). U.S. Pat. No. 4,227,350 (Fitzer), U.S. Pat. No. 4,331,453 (Dau et al.), U.S. Pat. No. 4,609,380 (Bamett et al.), U.S. Pat. No. 4,991,362 (Heyer et al.), U.S. Pat. No. 5,554,068 (Carr et al.), U.S. Pat. No. 5,712,210 (Windisch et al.), U.S. Pat. No. 5,591,239 (Edblom et al.), U.S. Pat. No. 5,681,361 (Sanders), U.S. Pat. No. 5,858,140 (Berger et al.), U.S. Pat. No. 5,928,070 (Lux), U.S. Pat. No. 6,017,831 (Beardsley et al.), U.S. Pat. No. 6,207,246 (Moren et al.), and U.S. Pat. No. 6,302,930 (Lux).

Abrasive articles according to the present disclosure are useful for abrading a workpiece. Methods of abrading range from snagging (i.e., high pressure high stock removal) to polishing (e.g., polishing medical implants with coated abrasive belts), wherein the latter is typically done with finer grades of abrasive particles. One such method includes the step of frictionally contacting an abrasive article (e.g., a coated abrasive article, a nonwoven abrasive article, or a bonded abrasive article) with a surface of the workpiece, and moving at least one of the abrasive article or the workpiece relative to the other to abrade at least a portion of the surface.

Examples of workpiece materials include metal, metal alloys, exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts crankshafts, furniture, and turbine blades. The applied force during abrading typically ranges from about 1 kilogram to about 100 kilograms.

Abrasive articles according to the present disclosure may be used by hand and/or used in combination with a machine. At least one of the abrasive article and the workpiece is moved relative to the other when abrading. Abrading may be conducted under wet or dry conditions. Exemplary liquids for wet abrading include water, water containing conventional rust inhibiting compounds, lubricant, oil, soap, and cutting fluid. The liquid may also contain defoamers, degreasers, for example.

Select Embodiments of the Present Disclosure

In a first embodiment, the present disclosure provides a magnetizable abrasive particle comprising a ceramic body having an outer surface, and a magnetizable layer disposed on a portion, but not the entirety, of the outer surface.

In a second embodiment, the present disclosure provides a magnetizable abrasive particle according to the first embodiment, wherein the ceramic body comprises a shaped ceramic body.

In a third embodiment, the present disclosure provides a magnetizable abrasive particle according to the second embodiment, wherein the shaped ceramic body comprises a precisely-shaped ceramic body.

In a fourth embodiment, the present disclosure provides a magnetizable abrasive particle according to any one of the first to third embodiments, wherein the outer surface of the ceramic body comprises a plurality of facets.

In a fifth embodiment, the present disclosure provides a magnetizable abrasive particle according to the fourth embodiment, wherein the magnetizable layer completely covers a single facet.

In a sixth embodiment, the present disclosure provides a magnetizable abrasive particle according to the fourth embodiment, wherein none of the facets is completely covered by the magnetizable layer.

In a seventh embodiment, the present disclosure provides a magnetizable abrasive particle according to any one of the first to sixth embodiment, wherein the ceramic body comprises a platelet having two opposed major facets connected to each other by a plurality of side facets.

In an eighth embodiment, the present disclosure provides a magnetizable abrasive particle according to the seventh embodiment, wherein the platelet is triangular.

In a ninth embodiment the present disclosure provides a magnetizable abrasive particle according to the seventh or eighth embodiment, wherein the magnetizable layer completely covers one of the two opposed major facets.

In a tenth embodiment, the present disclosure provides a magnetizable abrasive particle according to the seventh or eighth embodiment, wherein the magnetizable layer completely covers one of the side facets.

In an eleventh embodiment, the present disclosure provides a magnetizable abrasive particle according to the ninth embodiment, wherein the magnetizable layer has a magnetizable dipole oriented perpendicular to the facet which it completely covers.

In a twelfth embodiment, the present disclosure provides a magnetizable abrasive particle according to the ninth embodiment, wherein the magnetizable layer has a magnetic dipole oriented parallel to the facet which it completely covers.

In a thirteenth embodiment, the present disclosure provides a magnetizable abrasive particle according to any one of the first to sixth embodiments, wherein the ceramic body comprises a rod.

In a fourteenth embodiment, the present disclosure provides a magnetizable abrasive particle according to any one of the first to thirteenth embodiments, wherein the magnetizable layer comprises magnetizable particles disposed in a binder matrix.

In a fifteenth embodiment, the present disclosure provides a magnetizable abrasive particle according to the thirteenth or fourteenth embodiment, wherein the binder matrix comprises an organic binder matrix.

In a sixteenth embodiment, the present disclosure provides an abrasive article comprising a plurality of magnetizable abrasive particles according to any one of the first to fifteenth embodiments.

In a seventeenth embodiment, the present disclosure provides an abrasive article comprising a plurality of magnetizable abrasive particles according to the sixteenth embodiment retained in a binder material.

In an eighteenth embodiment, the present disclosure provides an abrasive article according to the seventeenth embodiment, wherein the abrasive article comprises a bonded abrasive wheel.

In a nineteenth embodiment, the present disclosure provides an abrasive article according to the seventeenth embodiment, wherein the coated abrasive article comprises an abrasive layer disposed on a backing, and wherein the abrasive layer comprises the binder material and the plurality of magnetizable abrasive particles.

In a twentieth embodiment, the present disclosure provides an abrasive article according to the seventeenth embodiment, wherein the abrasive article comprises a nonwoven abrasive, wherein the nonwoven abrasive comprises a lofty open nonwoven fiber web having an abrasive layer disposed on at least a portion thereof, and wherein the abrasive layer comprises the binder material and the plurality of magnetizable abrasive particles.

In a twenty-first embodiment the present disclosure provides an abrasive article according to the nineteenth embodiment, wherein a majority of the magnetizable abrasive particles are aligned parallel to each other.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless stated otherwise, all other reagents were obtained, or are available from fine chemical vendors such as Sigma-Aldrich Company, St. Louis, Mo., or may be synthesized by known methods.

Material abbreviations used in the Examples are described in Table 1, below.

TABLE 1

| ABBRE-VIATION | DESCRIPTION |
|---|---|
| CM | Silane Treated Calcium Metasilicate, obtained as 400 WOLLASTOCOAT from NYCO Minerals Inc., Willsboro, New York. |

TABLE 1-continued

| ABBRE-VIATION | DESCRIPTION |
|---|---|
| CRY | Cryolite, obtained as CRYOLITE TYPE RTN-C from Koppers Trading, Pittsburgh, Pennsylvania. |
| IO | Red iron oxide pigment. |
| MP | Magnetic primer, obtained as MAGNETIC PRIMER MAGNETIC GRAY from Krylon, Cleveland, Ohio. |
| PR | Resole phenolic resin, a 1.5:1 to 2.1:1 (phenol:formaldehyde) condensate catalyzed by 2.5% potassium hydroxide, 75% in water |
| SAP | Shaped abrasive particles were prepared according to the disclosure of U.S. Pat. No. 8,142,531 (Adefris et al). The shaped abrasive particles were prepared by molding alumina sol gel in equilateral triangle-shaped polypropylene mold cavities. After drying and firing, the resulting shaped abrasive particles, which were shaped as truncated triangular pyramids, were about 1.4 mm (side length) x 0.35 mm (thickness), with a draft angle approximately 98 degrees. The shaped abrasive particles were then coated with inorganic material according to the method described in U.S. Pat. No. 5,213,591 (Celikkaya et al). |

Example 1

SAP was placed in a polypropylene tool as described in Example 1 of PCT Pat. Publ. No. WO 2015/100018 A1 (Culler et al.), so that each of the abrasive particles resided in a respective triangular cavity of the tool with a tip pointing down and with the opposite sidewall exposed outside the cavity. The MP spray can was shaken for several minutes prior to use. While the abrasive mineral housed in the tool, the MP spray can was pointed down onto the tool and sprayed for about 4 seconds. After the spraying was done, the coated mineral was allowed to sit for 30 minutes to dry off any solvent After drying, the coated abrasive particles were dislodged from the tool.

Each of the resultant magnetized abrasive particles had a magnetic layer on the surface of an edge (sidewall) of the shaped abrasive particle, with a small amount continuing onto adjacent surfaces as shown in FIG. 8.

The response of the resultant magnetic shaped abrasive particles to the magnetic field was tested by placing the individual magnetic shaped abrasive particles on a piece of paper which was placed on a 6 inches (15.2 cm)×3 inches (7.62 cm)×0.5 inch (1.27 cm) Strong Neodymium Magnet N42 (Br Max=13200 gauss, NdFeB) magnet with north and south poles on opposite sides of the magnet separated by its thickness. The magnet was positioned horizontally with one of the magnetic poles oriented at the top surface of the magnet. Two locations on the magnet were selected.

A sheet of paper was placed over the upper surface of the magnet. When the magnetic shaped abrasive particles were placed on the paper over the center of the upper surface of the magnet where the magnetic field goes is aligned perpendicularly from the magnet the individual magnetic shaped abrasive particles were oriented upright with the coated edge facing upwards (as shown as FIG. 8) but inclined due to the weight of the abrasive particle, which was supported along a substantially uncoated side wall. When the magnetic shaped abrasive particles were placed on the paper over an end of the upper surface of the magnet, where the magnetic field approaches a parallel configuration with the longitudinal axis of the magnet and the paper and abrasive particles were agitated slightly, the individual abrasive minerals were oriented upright with the coated side wall of the shaped abrasive particle facing down on the paper as shown as FIG. 9.

Example 2

SAP was placed in a polypropylene tool as described in EXAMPLE 1, while the abrasive mineral was housed in the tool. The tool was placed on the 6 inch (15.2 cm)×0.5 inch (1.27 cm) end surface of the rare earth magnet used in Example 1. The tool was oriented such that the opposed major surface faces of the minerals were aligned parallel to the magnetic field lines where the tool was placed (i.e., the length of the exposed sidewall of the SAP particle was parallel to the thickness of the magnet). The MP spray can was shaken for several minutes prior to use. While the abrasive mineral housed in the tool, the MP spray can was pointed down onto the tool and sprayed for about 4 seconds. After the spraying was done, the coated mineral was allowed to sit for 30 minutes to dry off any solvent. After drying, the coated abrasive particles were dislodged from the tool. Each of the resultant magnetizable abrasive particles had a magnetizable coating on the surface of an edge (sidewall) of the shaped abrasive particle (shown in FIG. 10).

Example 3

Example 2 was repeated except that the tool was rotated 900 so that the magnetic field was oriented such that the opposed major surface faces of the minerals were aligned perpendicular to the magnetic field lines where the tool was placed (i.e., the thickness of the exposed sidewall of the SAP particle was parallel to the thickness of the magnet).

Each of the resultant magnetizable abrasive particles had a magnetizable coating on the surface of an edge (sidewall) of the shaped abrasive particle (shown in FIG. 11).

The response of resultant magnetizable shaped abrasive particles from Examples 2 and 3 to an applied magnetic field was tested by placing the individual abrasive minerals on a horizontal piece of paper which was placed onto the 6 inches (15.24 cm)×3 inches (7.62 cm) surface of the rare earth magnet used in Example 1. As in Example 1, magnetizable shaped abrasive particles from Examples 2 and 3 were placed at the edge of the magnet surface. The piece of paper holding the magnetic shaped abrasive particles was agitated slightly. The magnetic shaped abrasive particles were oriented upright (shown as FIG. 12) with the magnetic layer contacting the paper. In FIG. 12, the left magnetizable shaped abrasive particle was from Example 3 and the right magnetizable shaped abrasive particle was from Example 2.

Example 4

SAP was placed into equilateral triangle-shaped mold cavities (each cavity having a nominal opening with side length=2.235 mm, depth=0.559 mm, taper angle=8 degrees) at the surface of a polypropylene mold, so that each of the abrasive particles was oriented in a respective cavity of the tool with the largest triangular major surface of the abrasive particle exposed outside the tool. No magnetic field was applied. MP spray can was shaken for several minutes prior to use. While the abrasive mineral was housed in the tool, the MP spray can was pointed down onto the tool and sprayed for about 4 seconds. After the spraying was done, the coated magnetic shaped abrasive mineral was allowed to sit for 30 minutes to dry off any solvent. After drying, the coated abrasive particles were dislodged from the tool.

Each of the resultant magnetic shaped abrasive particles had a magnetic coating on the largest triangular major surface of the shaped abrasive particle as shown in FIGS. 13A and 13B.

The response of resultant abrasive particles to magnetic field was tested by placing the individual abrasive minerals on a piece of paper which was placed on a horizontal 6 inch (15.24 cm)×3 inch (7.62 cm) surface of the rare earth magnet used in Example 1. Two locations on the magnet were selected. When resultant magnetic shaped abrasive particles were placed on the center of the magnet where the magnetic field goes directly upwards from the magnet, the individual abrasive minerals were oriented upright with an edge facing down on the paper (as shown as FIG. 13A). When resultant abrasive particles were placed on the edge of the magnet where the magnetic field approaches a parallel path from the magnet, and the piece of paper holding the abrasive particles was agitated slightly, the individual abrasive minerals were laid flat with the coated surface facing upward (as shown in FIG. 13B).

Example 5

SAP was placed in a polypropylene tool as described in EXAMPLE 4. While the abrasive mineral housed in the tool, the tool was placed on the top of the 6 inch (15.24 cm)×3 inch (7.62 cm) surface of the rare earth magnet used in Example 1, such that the magnetic field lines were perpendicular to the tool. The MP spray can was shaken for several minutes prior to use. While the abrasive mineral housed in the tool, the MP spray can was pointed down onto the tool and sprayed for about 4 seconds. After the spraying was done, the coated mineral was allowed to sit for 30 minutes to dry off any solvent After drying, the coated abrasive particles were dislodged from the tool.

Each of the resultant magnetic shaped abrasive particles had a magnetic coating on one major surface of the shaped abrasive particle as shown in FIGS. 14A and 14B.

The response of resultant abrasive particles to magnetic field was tested by placing the individual abrasive minerals on a piece of paper which was placed on a horizontal 6 inches (15.24 cm)×3 inches (7.62 cm) surface of the rare earth magnetic used in Example 1. Two locations on the magnet were selected. When resultant magnetic shaped abrasive particles were placed on the edge of the magnet where the magnetic field approached a parallel path from the magnet, the individual abrasive minerals were oriented upright with an edge facing down on the paper (as shown in FIG. 14A). When resultant abrasive particles were placed on the center of the magnet where the magnetic field went directly upwards from the magnet, individual abrasive minerals were laid flat with the coated surface facing upward on the paper (as shown in FIG. 14B).

Example 6

A precut vulcanized fiber disc blank with a diameter of 7 inches (17.8 cm), having a center hole of ⅞ inch (2.2 cm) diameter and a thickness of 0.83 mm (33 mils) obtained as DYNOS VULCANIZED FIBRE from DYNOS GmbH, Troisdorf, Germany was used as the abrasive backing. From this 7-inch diameter disc, 3-inch (7.62-cm) diameter discs were punched out and used. The 3-inch fiber substrate was coated by brush with make resin, consisting of 49.2 parts of PR; 40.6 parts of CM, and 10.2 parts of deionized water, to a wet weight of 0.89±0.06 grams. The coated 3-inch disc was then placed directly in the center of an 8-inch (20.3 cm) diameter×2 inches (5.1 cm) thick rare earth neodymium disc magnet (grade N50, obtained from Supermagnetman, Pelham, Ala.) with an 8-inch diameter which was magnetized through its thickness (i.e., north and south poles on opposite surfaces separated by the thickness). Face-coated magnetic shaped abrasive particles according to EXAMPLE 4, were then dropped from a distance of 1 inch (2.54 cm) to uniformly cover the surface of the disc. The abrasive particles were added to a weight of 1.55±0.07 grams. The disc was given a make pre-cure at 90° C. for 12 hours followed by 103° C. for 1 hour. The pre-cured disc was then coated by brush with size resin consisting of 37.4 parts of PR, 58.8 parts of CRY, 1.8 parts of IO, and 2.0 parts of deionized water. Excess size resin was removed with a dry brush until the flooded glossy appearance was reduced to a matte appearance. The amount of size resin applied was 3.15 g±0.06 grams. The disc was cured for 90 minutes at 90° C., followed by 16 hours at 103° C.

Example 7

The procedure described in EXAMPLE 6 was repeated, with the exception that the 3-inch disc was never subjected to the circular magnet.

Comparative Example A

The procedure generally described in EXAMPLE 6 was repeated, with the exception that the uncoated SAP, instead of coated abrasive particles, was drop coated.

Performance Test

Discs (3-inch (7.6-cm) diameter) made from EXAMPLES 6, 7, and COMPARATIVE EXAMPLE A were allowed to equilibrate with ambient humidity for 2 days before testing. A quick change attachment of the type described in U.S. Pat. No. 6,817,935 (Bates et al.) was affixed to the center back of each disc using adhesive. The disc to be tested was attached to a back pad, obtained as ROLOC DISC PAD TR 45091 from 3M Company, which was mounted on an electric rotary tool. The rotary tool was disposed over an X-Y table having a 1018 carbon steel workpiece measuring 14 inches (35.56 cm)×6 inches (15.24 cm) secured to the X-Y table. The rotary tool was then activated to rotate at 9000 rounds per minute. The abrasive article was then urged at an angle of 5 degrees against the bar at a load of 5 pounds (2.27 kilograms). For each cycle, the disc traversed across the 14 inches (35.56 cm)×6 inches (15.24 cm) face of the workpiece for 20 passes at a rate of 4.7 inches/second (11.9 cm/second) as to not go over the same abraded area twice. The mass of the workpiece was measured before and after each cycle to determine the total mass loss in grams after each cycle. A cumulative mass loss was determined at the end of 4 cycles. The test result for each example is shown in Table 2, below.

TABLE 2

| | MASS LOSS IN GRAMS | | |
|---|---|---|---|
| | EXAMPLE 6 | EXAMPLE 7 | COMPARATIVE EXAMPLE A |
| Cycle 1 | 45.48 | 32.85 | 34.36 |
| Cycle 2 | 37.27 | 28.73 | 28.73 |
| Cycle 3 | 35.09 | 25.19 | 21.11 |
| Cycle 4 | 34.65 | 20.33 | 20.27 |
| Cumulative (total) | 152.49 | 107.10 | 102.99 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A magnetizable abrasive particle comprising a ceramic body having an outer surface and a magnetizable layer disposed on a portion, but not the entirety, of the outer surface, wherein the ceramic body comprises a platelet having two opposed major facets connected to each other by a plurality of side facets, wherein the magnetizable layer completely covers one of the two opposed major facets, and wherein the magnetizable layer has a magnetic dipole oriented perpendicular to the facet which it completely covers.

2. The magnetizable abrasive particle of claim 1, wherein the ceramic body comprises a shaped ceramic body.

3. The magnetizable abrasive particle of claim 2, wherein the shaped ceramic body comprises a precisely-shaped ceramic body.

4. The magnetizable abrasive particle of claim 1, wherein the magnetizable layer completely covers a single facet.

5. The magnetizable abrasive particle of claim 1, wherein the platelet is triangular.

6. The magnetizable abrasive particle of claim 1, wherein the magnetizable layer comprises magnetizable particles disposed in a binder matrix.

7. The magnetizable abrasive particle of claim 6, wherein the binder matrix comprises an organic binder matrix.

8. A plurality of magnetizable abrasive particles according to claim 1.

9. An abrasive article comprising a plurality of magnetizable abrasive particles according to claim 1 retained in a binder material.

10. An abrasive article according to claim 9, wherein the abrasive article comprises a bonded abrasive wheel.

11. An abrasive article according to claim 9, wherein the abrasive article comprises a coated abrasive article, wherein the coated abrasive article comprises an abrasive layer disposed on a backing, and wherein the abrasive layer comprises the binder material and the plurality of magnetizable abrasive particles.

12. An abrasive article according to claim 9, wherein the abrasive article comprises a nonwoven abrasive, wherein the nonwoven abrasive comprises a lofty open nonwoven fiber web having an abrasive layer disposed on at least a portion thereof, and wherein the abrasive layer comprises the binder material and the plurality of magnetizable abrasive particles.

13. An abrasive article according to claim 9, wherein a majority of the magnetizable abrasive particles are aligned parallel to each other.

* * * * *